(12) United States Patent
Ito et al.

(10) Patent No.: US 8,282,299 B2
(45) Date of Patent: Oct. 9, 2012

(54) FRICTION BODY, WRITING INSTRUMENT AND WRITING INSTRUMENT SET

(75) Inventors: Yoshihiro Ito, Nagoya (JP); Shouichi Ohkawa, Nagoya (JP); Katsuyuki Fujita, Nagoya (JP)

(73) Assignee: The Pilot Ink Co., Ltd., Nagoya-shi (JP)

( * ) Notice: Subject to any disclaimer, the term of this patent is extended or adjusted under 35 U.S.C. 154(b) by 1118 days.

(21) Appl. No.: 11/946,071

(22) Filed: Nov. 28, 2007

(65) Prior Publication Data

US 2008/0124164 A1    May 29, 2008

(30) Foreign Application Priority Data

Nov. 29, 2006   (JP) .................... 2006-321762

(51) Int. Cl.
*B43K 29/00* (2006.01)
(52) U.S. Cl. ........................................ 401/195
(58) Field of Classification Search .......... 401/195, 401/198
See application file for complete search history.

(56) References Cited

U.S. PATENT DOCUMENTS

| | | | | |
|---|---|---|---|---|
| 6,017,594 | A * | 1/2000 | Sheets | 428/1.1 |
| 6,346,024 | B1 * | 2/2002 | Engel | 446/14 |
| 2003/0016282 | A1 | 1/2003 | Koizumi | |
| 2007/0189836 | A1 | 8/2007 | Senga et al. | |

FOREIGN PATENT DOCUMENTS

| | | |
|---|---|---|
| EP | 1080945 A2 | 3/2001 |
| JP | 7-241388 A | 9/1995 |
| JP | 2003-206432 A | 7/2003 |
| JP | 2004-148744 A | 5/2004 |
| JP | 2004-205568 A | 7/2004 |
| JP | 2005-088308 A | 4/2005 |
| JP | 2006-123324 A | 5/2006 |
| JP | 2006-263921 A | 10/2006 |

OTHER PUBLICATIONS

Extended European Search Report dated Jan. 14, 2010 in European Application No. 07023035.4, 6 pages.
Singapore Search Report Dated Aug. 7, 2009.
Office Action issued Oct. 11, 2010, in counterpart Chinese Application No. 200710196534.6.

* cited by examiner

*Primary Examiner* — Huyen Le
(74) *Attorney, Agent, or Firm* — Sughrue Mion, PLLC

(57) ABSTRACT

A friction body that produces frictional heat allowing development, disappearance or change of color of handwriting formed with a writing instrument for producing thermochromic handwriting, with the friction body having a friction coefficient of 0.2 to 1.0 when rubbed against paper surface, and a writing instrument for use in forming thermochromic handwriting which is equipped with the friction body and a writing instrument set including the friction body and a writing instrument for use in forming thermochromic handwriting.

7 Claims, 9 Drawing Sheets

FRICTION BODY, WRITING INSTRUMENT AND WRITING INSTRUMENT SET

TECHNICAL FIELD

The present invention relates to a friction body, and to a writing instrument and a writing instrument set using the friction body. More specifically, the invention relates to a friction body that allows a color change of thermochromic handwriting by frictional heat, and to a writing instrument and a writing instrument set using the friction body.

BACKGROUND ART

There is a friction body in which changes color of thermochromic handwriting formed on a paper surface. The handwriting is changed its color by rubbing against the paper surface on which the handwriting is formed with any of those friction bodies. Then, the handwriting is visually recognized as being different that before the rubbing (see, e.g., Japanese Patent Unexamined Publication JP-A-2004-148744).

As the material of the friction body, there are exemplified an eraser, an elastomer and a plastic foam.

However, the eraser develops bits of grit during rubbing against paper surface and makes surroundings dirty, and besides, since the eraser is worn itself, it difficult to meet permanent use requirement.

On the other hand, the elastomer and the plastic foam don't have moderate friction coefficients due to their qualities and grades. When they have too large friction coefficients, rubbing them against paper surface sometimes leads to breakage of paper, wrinkling of paper or roughening (scuffing) of paper surface. Therefore, there occurs a problem that rewrite on rubbed areas becomes impossible or causes smearing to fail at forming good-quality handwriting. Contrary to the above case, too small friction coefficients of those friction bodies weaken the perception of rubbing. As a result, it is done unwittingly to rub paper with them under loads greater than necessary and the paper rubbed becomes uneven to spoil its appearance, and besides, the number of rubbings is apt to increase, and feelings of being inconvenient and tired are produced and such friction bodies come into disuse. Accordingly, their salability is impaired.

SUMMARY OF THE INVENTION

The invention aims to solve the above mentioned problems, and intends to provide a friction body that allows rubbing against thermochromic handwriting formed on a paper surface without impairing the paper, and more particularly, without making the paper uneven, and thereby enables good-quality handwriting to be formed again on rubbed areas and further permits reduction of bother and tiredness in rubbing to a minimum and enhancement of convenience, and further to provide a writing instrument and a writing instrument set using the friction body.

According to an aspect of the invention is a friction body that produces frictional heat allowing development, disappearance or change of color of handwriting formed with a writing instrument for producing thermochromic handwriting, what's more that has a friction coefficient of 0.2 to 1.0 when rubbed against paper surface.

Preferably, the friction coefficient of the friction body is in a range of 0.3 to 0.9.

Further, there is provided a writing instrument having the aforesaid friction body as a part of a writing instrument for producing thermochromic handwriting.

Furthermore, there is provided a writing instrument set including the friction body and a writing instrument for producing thermochromic handwriting.

In accordance with the invention, it is possible to provide a friction body that allows a paper surface on which handwriting is formed to have good keeping quality because it neither impairs paper nor makes paper uneven at the time of rubbing against the paper surface. Further, not only it satisfies practicality of repetitive formation of good-quality handwriting on rubbed areas of paper, but also it has a high commercial value through reduction of bother and tiredness in rubbing. Furthermore, the invention can provide a writing instrument and a writing instrument set which each use such a friction body.

DETAILED DESCRIPTION OF THE PREFERRED EMBODIMENTS

The present friction body produces frictional heat by rubbing against a paper surface on which thermochromic handwriting is formed thereby to allow development, disappearance or change of color of the handwriting.

For the friction body, any material may be used so long as its friction coefficient is in a range of 0.2 to 1.0, preferably 0.3 to 0.9, and more preferably 0.4 to 0.8.

When the friction body has a friction coefficient greater than 1.0, its friction against the paper surface becomes excessive, there is possibility that the paper is broken or wrinkled, or paper surface is roughened (scuffed).

In such cases, not only the appearance of paper is impaired, but also it becomes impossible to write again on rubbed areas of paper or, even if rewriting is possible, handwriting formed on rubbed areas of paper is prone to run and inferior in quality because the paper is wrinkled or the paper surface is roughened.

On the other hand, a friction body having a friction coefficient smaller than 0.2 is too small in resistance to paper surface and becomes a cause of poor perception of rubbing. So there is a tendency to rub paper hard with such a friction body with a load greater than necessary, and the paper rubbed becomes uneven and spoils its appearance, furthermore, the number of rubbings is apt to increase. As a result, the user of such a friction body has a feeling of being inconvenient and tired and the friction body comes into disuse in some cases.

In the invention, the friction coefficient of a friction body is defined as a friction coefficient (frictional force/load) worked out by measurement under the condition that the friction body is rubbed against paper surface at a speed of 100 mm/min with a load of 500 g.

The material of the friction body is not particularly limited to, any of glass, metal, wood, stone and resin materials can be used.

However, it is appropriate to use a resin having elasticity, such as rubber, which can give a feeling of rubbing with an eraser when friction is applied thereto, and thereby it is possible to soften an impact which a friction body has on paper when performing development, disappearance or change of color of handwriting and to rub the friction body against the handwriting without giving an objectionable impact to users.

Examples of a material suitable for the friction body include silicone resin, styrene-based resin (e.g., a styrene-butadiene copolymer, a styrene-ethylene-butadiene copolymer), fluorine based resin, chloroprene resin, nitrile resin, polyester based resin, ethylene-propylene-diene rubber (EPDM), polyethylene and polypropylene.

Rubbing the friction body against paper surface is done manually, so it requires no large-scale apparatus and can be used as a part of a writing instrument for producing thermochromic handwriting. That is, the friction body can be provided at a rear end of a barrel or, if the writing instrument has a cap, the friction body can be provided at a tip of the cap.

Figure 1:
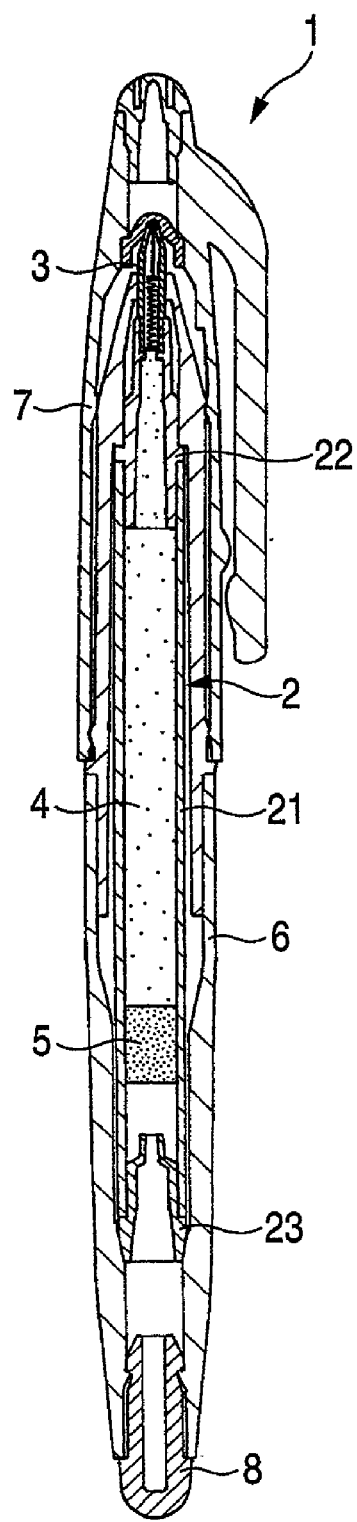
FIG. 1 is a longitudinal cross-sectional view showing one embodiment of a writing instrument provided with a friction body according to the invention.
Figure 2:
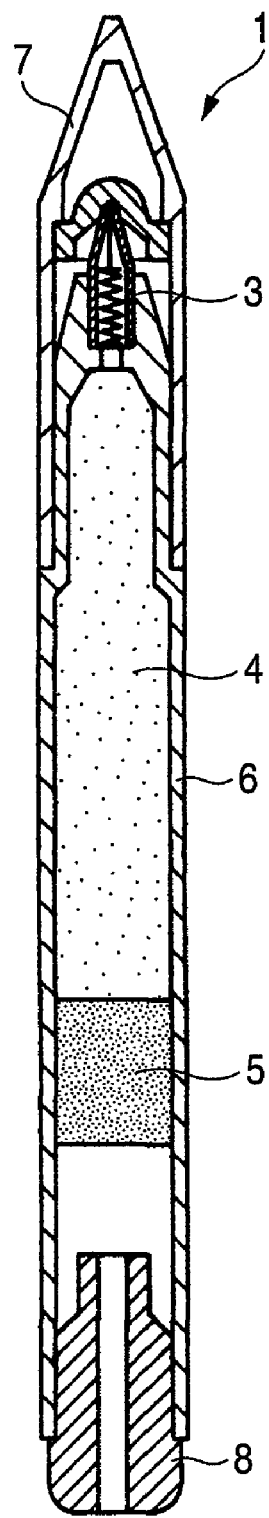
FIG. 2 is a longitudinal cross-sectional view showing another embodiment of a writing instrument provided with a friction body according to the invention.
Figure 3:
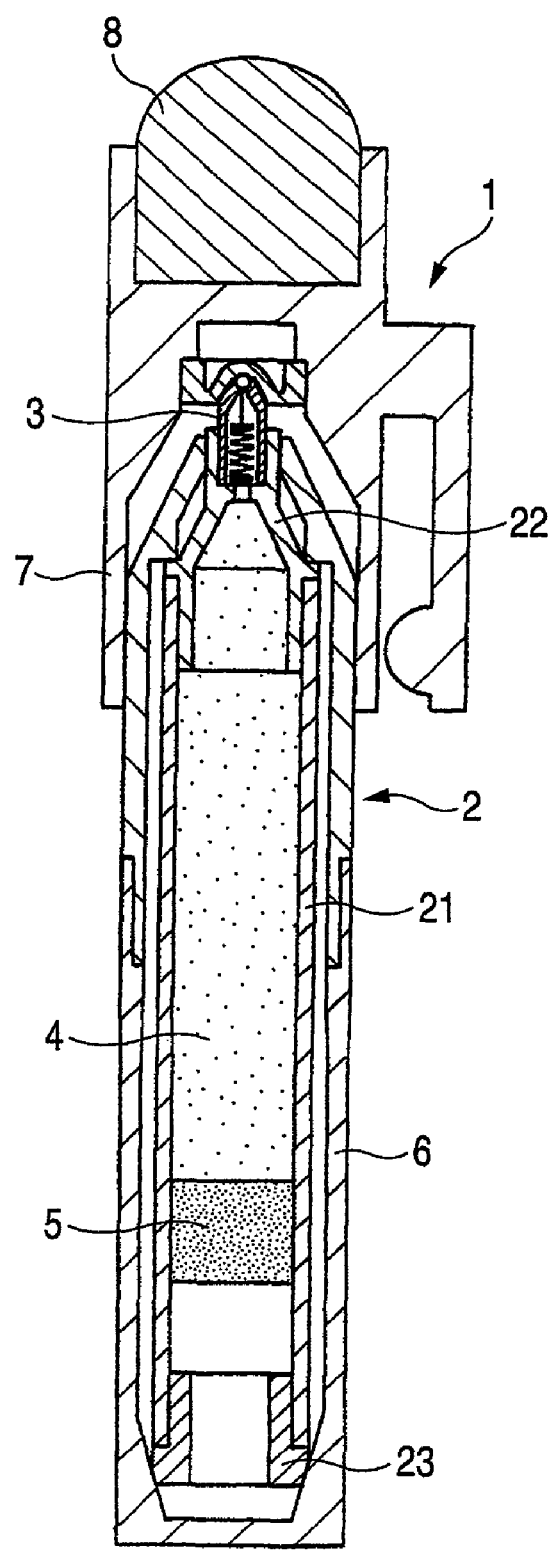
FIG. 3 is a longitudinal cross-sectional view showing still another embodiment of a writing instrument provided with a friction body according to the invention.
Figure 4:
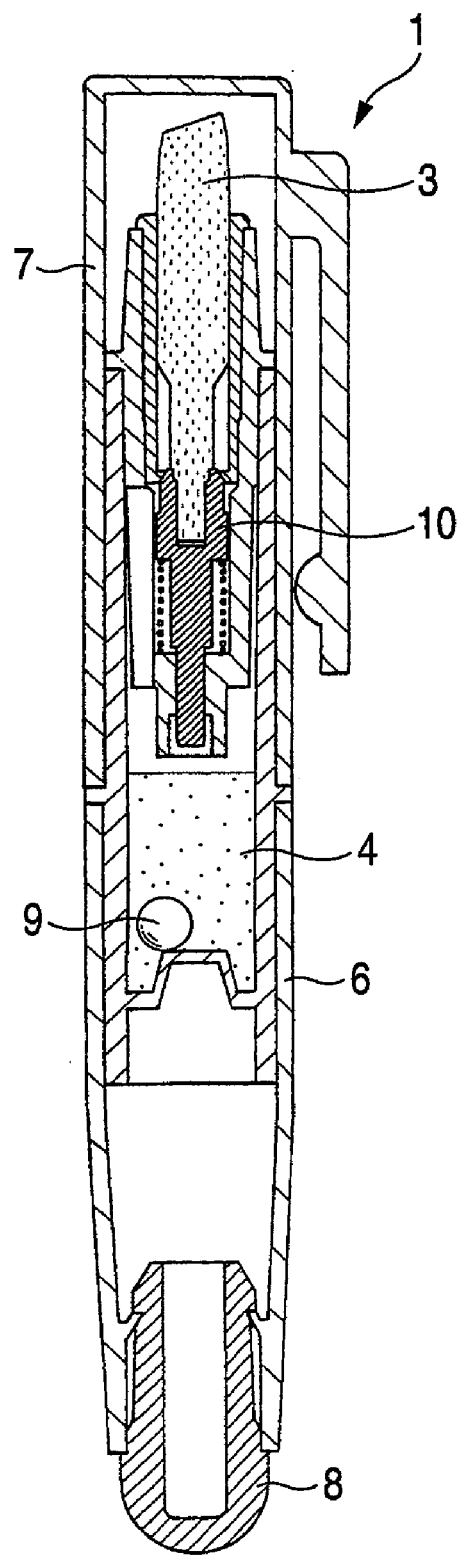
FIG. 4 is a longitudinal cross-sectional view showing a further embodiment of a writing instrument provided with a friction body according to the invention.
Figure 5:
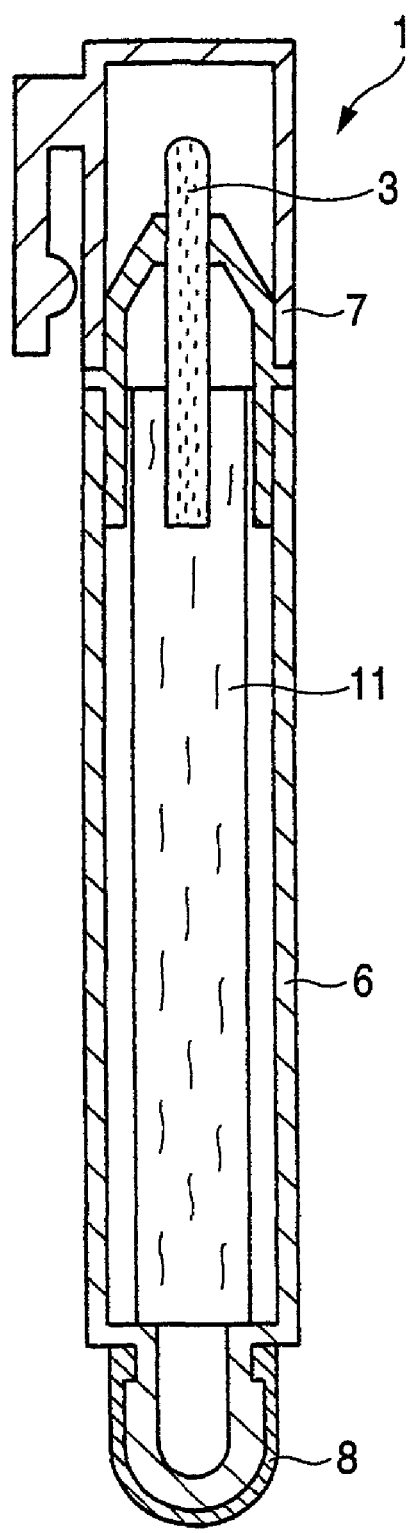
FIG. 5 is a longitudinal cross-sectional view showing another embodiment of a writing instrument provided with a friction body according to the invention.

More specifically, writing instruments, such as a ballpoint pen, a felt pen, a marking pen and a brush pen, wherein thermochromic ink is included and a friction body is provided at the rear end of a barrel (see FIGS. 1, 2, 4, 5 and 6) or a cap fitted with a friction body is used (See FIG. 3) can be given as examples.

Alternatively, it is possible to make a writing instrument set including a frictional member having the friction body (FIG. 7) and a writing instrument for producing thermochromic handwriting (FIG. 8) which are separated from each other.

By having writing instruments for individually providing two or more lines of thermochromic handwriting differing in color tone, the writing instrument set can form letters and patterns with a plurality of vivid colors.

Additionally, the writing instruments are not limited to liquid thermochromic ink-contained ones, but they may be thermochromic solid writing instruments, such as crayons.

Addition of a coloring agent selected from dyes or pigments for general purpose use to the friction body can enhance designing capability and allows the friction body to serve also as a color display member conforming to the color of handwriting.

Furthermore, other additives of various kinds, such as a filler, can also be added to the friction body, if needed.

The coloring agent incorporated effectively in the thermochromic ink or thermochromic solid writing instrument is a microencapsulated pigment prepared by enclosing in microcapsules a reversibly thermochromic composition which contains at least three essential ingredients, namely:

(a) an electron-donating color-showing organic compound;

(b) an electron-accepting compound; and (c) a reaction medium determining the temperature at which color reaction between (a) and (b) takes place, and whose color disappears by heating.

As the reversibly thermochromic composition, as disclosed in JP-B-51-44706, JP-B-51-44707 and JP-B-1-29398, it is possible to use the compositions having following properties:

the color is changed between before and after the temperature is raised beyond individually specified temperatures (color-changing points);

it shows a decolorized state in the temperature region higher than the color-changing point on the higher temperature side, and it shows a color-developed state in the temperature region lower than the color-changing point on the lower temperature side;

only one of the foregoing two states is presented at ordinary temperature;

the other state is kept while hot or cold energy required for developing that state is applied thereto but return to the one state at ordinary temperatures when application of the hot or cold energy ceases; and relatively small in hysteresis width ($\Delta H=1°$ to $7°$ C.)

However, as disclosed in JP-B-4-17154, JP-A-7-179777, JP-A-7-33997, JP-A-8-39936 and JP-A-2005-1369, it is preferable to use the reversibly thermochromic compositions having following properties:

large in hysteresis characteristics ($\Delta H=8°$ to $70°$ C.);

when plotting the color density change as a function of temperature, a case where increasing the temperature from a lower temperature side which is lower than the color change temperature region is greatly different from a case where decreasing the temperature from a higher temperature side which is higher than the cooler change temperature region; and having a color-memory property which can kept the color-developed state at lower temperatures or the decolorized state at higher temperatures in the specified temperature regions.

The hysteresis characteristic represented by the color density-temperature plot of the reversibly thermochromic composition is described below.

Figure 9:
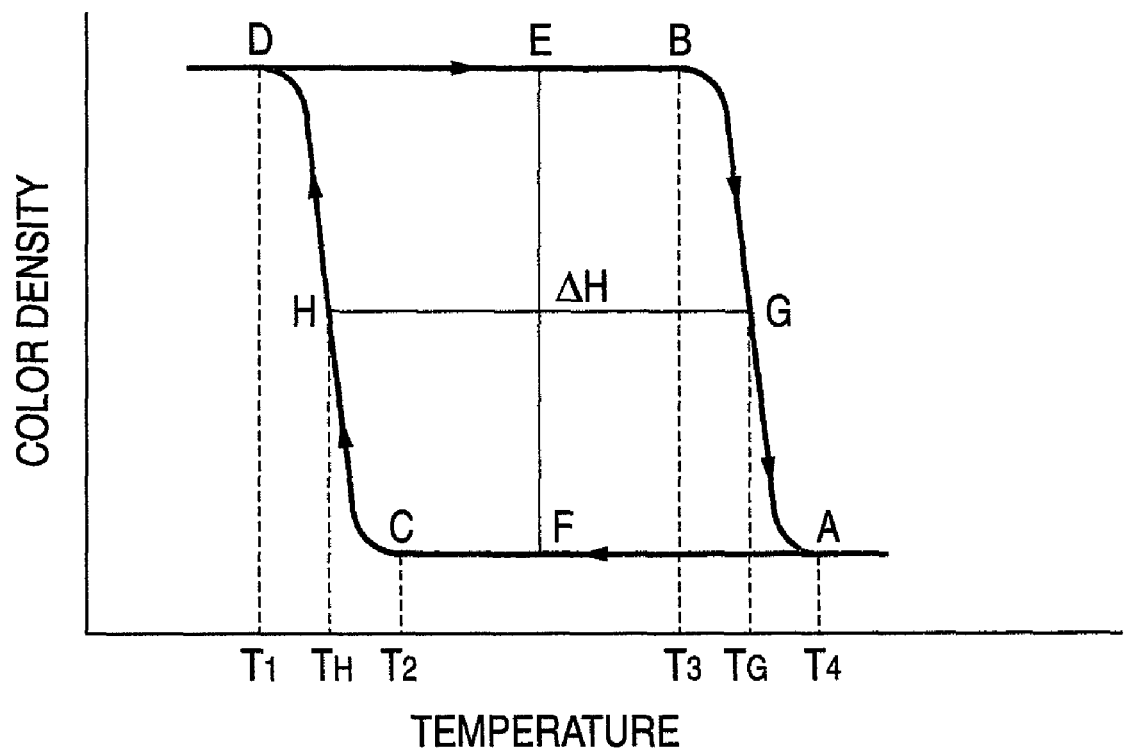
FIG. 9 is a graph illustrating a color changing behavior of a reversibly thermochromic composition.

In FIG. 9, the color density is plotted as ordinate and the temperature as abscissa. The variation of color density with temperature progresses along the direction of arrows.

Herein, "A" is a point indicating the density at the temperature $T_4$ where the completely decolorized state is attained (hereinafter referred to as the completely decolorizing temperature), "B" is a point indicating the density at the temperature $T_3$ where decolorization starts (hereinafter referred to as the decolorization starting temperature), "C" is a point indicating the density at the temperature $T_2$ where color development starts (hereinafter referred to as the color-development starting temperature), and "D" is a point indicating the density at the temperature $T_1$ where the completely color-developed state is attained (hereinafter referred to as the completely color-developing temperature).

The color-changing temperature region is a temperature region between the temperatures $T_1$ and $T_4$, and therein both a first color phase and a second color phase can be present. A temperature region between the temperatures $T_2$ and $T_3$, which has a great difference in color densities, is a substantially color-changing region (two-phase retaining temperature region).

Additionally, the length of a line segment EF is a measure of a contrast between colors before and after a change, and the length of a line segment HG passing through the midpoint of the line segment EF is a temperature width showing the degree of hysteresis (hereinafter referred to as the hysteresis width $\Delta H$). When this $\Delta H$ value is small, only one of the two states before and after a color change can be present at ordinary temperatures. When the ΔH value is great, on the other hand, it becomes easy to retain both states before and after a color change.

Specifically, the reversibly thermochromic compositions having color-memory properties can serve effectively a function of retaining colors they show in an ordinary state (in a range of daily-life temperatures) by adjusting:

their completely color-developing temperatures $T_1$ to a range of temperatures obtainable only in refrigeration chambers or cold climates, namely a range of −30° to 10° C., preferably −30° to 0° C., and more preferably −30° to −10° C.;

their completely decolorizing temperature $T_4$ to a range of temperatures obtainable from frictional heat with the friction bodies and familiar heaters, such as a hair dryer, namely a range of 30° to 90° C., preferably 50° to 80° C., and more preferably 60° to 80° C.; and defining their ΔH values so as to fall within the 40° to 60° C. range.

A writing instrument to which the invention is applied holds ink that contains microcapsuled pigments enclosing a reversibly thermochromic composition in a colored state. It is preferable that the writing instrument is structured so that handwriting formed therewith is not decolorized easily by touch of finger, further the handwriting decolorized does not develop color again.

Therefore, settings of the temperatures $T_1$ and $T_4$ become very important factors.

As the form of microcapsuled pigments, though it is not refused to adopt a form circular in cross section, adoption of forms non-circular in cross section is effective.

Handwriting formed by writing is in a state that the microcapsuled pigments are densely aligned and adhered to a written surface so that their long diameter sides (maximum outer diameter sides) are closely contacted with the written surface. Accordingly, the handwriting shows coloration with a high density. Further, when external force is applied by rubbing the friction body against the handwriting, the microcapsuled pigments are subtly elastic deformed so as to relieve the external forces and prevent breakage of microcapsule wall. As a result, effective development of thermochromic function can be attained without impairment.

Herein, it is preferable that the microcapsuled pigments whose forms are non-circular in cross section have a mean value of their maximum outer diameters in a range of 0.5 to 5.0 μm and the ratio of the reversibly thermochromic composition to a wall film lies within a range of 7/1 to 1/1 (by weight).

In a system of microcapsuled pigments (including those circular in cross section) whose maximum outer diameters are greater than 5.0 μm on average, the capability of flowing out through capillary gaps is degraded; while in a system of microcapsuled pigments whose maximum outer diameters are smaller than 0.5 μm on average, it is difficult to show coloration with a high density. Furthermore, it is appropriate that the mean value of maximum outer diameters be from 1 to 4 μm and the mean value of microcapsule diameters [(maximum outer diameter+minimum outer diameter in midsection)/2] be from 1 to 3 μm.

When the ratio of the reversibly thermochromic composition to the wall film is greater than the range specified above, the thickness of the wall film becomes too thin, and decreases in pressure resistance and heat resistance are caused; while when the ratio of the wall film to the reversibly thermochromic composition is greater than the range specified above, it is difficult for the color density and clarity at the time of color development to escape being lowered. Moreover, it is advantageous for the reversibly thermochromic composition/wall film ratio to lie within the range of 6/1 to 1/1 (by weight).

Examples of a method usable for microencapsulating the reversibly thermochromic composition include an interfacial polymerization method, an interfacial polycondensation method, an in Situ polymerization method, a submerged cure coating method, a method of utilizing phase separation from an aqueous solution, a method of utilizing phase separation from an organic solvent, a molten dispersion cooling method, an aerial suspension coating method and a spray drying method. From these methods, the method according to the intended use is chosen as appropriate. In addition, it is also possible to form a secondary resin film responsive to the desired purpose on the microcapsule surface, and thereby durability is imparted or surface characteristics are reformed. The thus formed microcapsules also can be put into practical use.

The microcapsuled pigments can be mixed in a proportion of 2 to 50% by weight (preferably 3 to 40% by weight, far preferably 4 to 30% by weight) to the total amount of ink. When the proportion is lower than 2% by weight, the developed color density is insufficient; while, when the proportion is higher than 50% by weight, ink flowability is degraded and writing property is impaired.

As to the ink, ink containing the microcapsuled pigments in a state of being dispersed in a vehicle is effectively used. The vehicle is preferably a water base-vehicle, but an oil base vehicle may be used.

Examples of such ink include shear thinning ink containing a shear thinning property imparting agent and cohesive ink in which microcapsuled pigments are suspended in a loosely condensed state by use of a water-soluble polymeric flocculant. As still another example, there is an ink in which difference in specific gravity between a microencapsulated pigment and a vehicle is controlled to be 0.05 or below.

By addition of the shear thinning property imparting agent, aggregation and sedimentation of microcapsuled pigments can be restrained, and also, the handwriting can be inhibited from smearing. Thus, handwriting can be formed with good-quality.

Furthermore, when the writing instrument is in a form of ballpoint pen, it is possible to prevent the ink leakage from a gap between the ball and the tip at not-used-time, and also prevent backflow of ink when the tip of the instrument stand upward (in an upright state).

Examples of the shear thinning property imparting agent include xanthan gum, welan gum, succinoglycan (with an average molecular weight of about one million to about eight millions) as an organic acid-modified heteropolysaccharide containing glucose and galactose as constituent monosaccharides, guar gum, locust bean gum and a derivative thereof, hydroxyethyl cellulose, alkylester alginate, a polymers containing alkylester methacrylate as a main constituent and having molecular weight of one hundred thousand to one hundred and fifty thousands, glucomannan, thickening polysaccharide extracted from sea weeds and having a gelling capability, such as agar or carrageenan, benzylidenesorbitol and benzylidenexylitol or their derivatives, a cross-linkable acrylic acid polymer, inorganic fine particles, a polyglycerine fatty acid ester, a polyoxyethylenesorbitan fatty acid ester, a polyethylene glycol fatty acid ester, a polyoxyethylene alkyl ether-polyoxypropylene alkyl ether, a polyoxyethylene alkyl phenyl ether, a nonionic based surfactant having its HLB value in the range of 8 to 12; such as fatty acid amide, a salt of dialkyl- or dialkenylsulfosuccinic acid, a mixture of an N-alkyl-2-pyrrolidone and an anionic based surfactant, and a mixture of polyvinyl alcohol and an acrylic based resin.

As the water-soluble polymeric flocculant, a nonionic water-soluble macromolecular compound can be suitably used.

Examples of such a compound include polyvinyl pyrrolidone, polyethylene oxide, a water-soluble polysaccharide and a nonionic water-soluble cellulose derivative. Examples of a water-soluble polysaccharide include tragacanth gum, guar gum, pulullan and cyclodextrin. Examples of a nonionic water-soluble cellulose derivative include methyl cellulose, hydroxyethyl cellulose, hydroxypropyl cellulose, hydroxyethylmethyl cellulose and hydroxypropylmethyl cellulose.

In the reversibly thermochromic ink for use in the invention, any water-soluble polymer can be applied so long as it shows a function of forming loose cross-links between pigment particles, but the nonionic water-soluble cellulose derivatives recited above can function most effectively.

The polymeric flocculant can be mixed in a proportion of 0.05 to 20% by weight to the total amount of ink composition.

Water and, if needed, a water-soluble organic solvent can be mixed in the ink.

Examples of such an organic solvent include ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone and N-methyl-2-pyrrolidone.

When the ink according to the invention is used to be charged in a ballpoint pen, it is appropriate that a lubricant be further added to the ink to avoid wearing away of the ball receiving seat.

In addition to the lubricant, a resin, such as an acrylic resin, a styrene-maleic acid copolymer, a cellulose derivative, polyvinyl pyrrolidone, polyvinyl alcohol or dextrin, can be added to the ink as required, and thereby adhesion to paper surface and viscosity can also be imparted to the ink.

Moreover, a pH adjuster, a rust inhibitor, a fungicide, urea, a wetting agent, an antifoaming agent, a dispersant, and a fluorinated based or nonionic based surfactant capable of enhancing permeability of ink may be added, too.

The thus prepared ink is charged into a writing instrument, such as a marking pen or a ballpoint pen, having a tip, such as a marking pen tip or a ballpoint pen tip, at the writing point, and put to practical use.

In the case of charging ink into a ballpoint pen, the ballpoint pen itself has no particular limitations as to its structure or shape.

Examples of a ballpoint pen include:

a ballpoint pen in which the ink is impregnated in an ink absorber made of a fiber bundle accommodated in a barrel, and thus impregnated ink is fed to a writing point equipped with a ball point . . . pen tip;

a ballpoint pen in which the ink is directly contained in a barrel, and a predetermined amount of ink is fed to a writing point equipped with a ballpoint pen tip via an ink flow control member with a comb-like grooves or an ink flow control member made up of a bundle of fibers; and a ballpoint pen in which a barrel contains an ink accommodation tube filled with the shear thinning ink, the ink accommodation tube is communicated with a tip having a ball at the point and an end face of the ink accommodation tube is kept in close contact with a liquid stopper for prevention of backflow.

The ballpoint pen tip is described below in more detail. Examples of tips applicable to the ballpoint pen as recited above include:

a tip that holds a ball in a ball holding part formed by deforming the neighborhood of a metal pipe tip end in an inward direction from an outer surface of the pipe;

a tip that holds a ball in a ball holding part formed by cutting a metallic material with a drill or the like;

a tip that is made of a metal or a plastic and has a ball receiving seat made of a resin in an interior of the tip; and a tip in which a ball held by the tip is urged forward by a spring.

The ball usable therein is made of hard metal, stainless steel, ruby, ceramic, resin or rubber, and has a diameter of 0.3 to 3.0 mm, preferably 0.4 to 1.5 mm, far preferably 0.5 to 1.0 mm.

The ink accommodation tube may be molded of a thermoplastic resin, such as polyethylene, polypropylene, polyethylene terephthalate or nylon.

By using a colorless transparent, colored transparent or half-transparent molded tube, the color of ink or the residual amount of ink can be checked.

The ink accommodation tube may be connected to a tip directly or via a connection member.

Additionally, the ink accommodation tube may take a form of a refill accommodated within a barrel, or a form of a barrel itself in which the front-end part of barrel is equipped with a tip and the ink is directly charged into the barrel.

The rear end of ink accommodated in the ink accommodation tube is provided with a liquid ink follower. In addition, the liquid ink follower may be used in combination with a solid ink follower.

When charging the ink into a marking pen, the marking pen itself has no particular limitations as to its structure or shape. Examples of the marking pen are:

a marking pen in which an ink absorber made of a fibrous convergent body is included in a barrel, a tip made of processed fibrous body in which capillary gaps are formed is mounted in the barrel directly or via a connecting member and the ink absorber and the tip are connected together;

a marking pen in which a barrel directly holds the ink and a predetermined amount of the ink is fed to a tip via an ink flow control member of a comb-grooves-shape; and a marking pen in which a valve body capable of opening by pressing a pen point is disposed between a tip and an ink accommodation tube and the ink is contained directly in the ink accommodation tube.

The pen point is a traditional general-purpose porous member having communicating pores, whose porosity is within a range of about 30% to about 70%, such as a resin-finished fibrous body, a fusion process product of hot-melting fiber or a felt body. One end of the porous member is processed into a shape appropriate to the intended use, such as the shape of a bombshell, a rectangle or a chisel, and the thus worked member is put to practical use.

The ink absorber is a material formed by tying crimped fibers into a bundle along the length direction, enclosing the bundle in a plastic tube or with a covering material, such as film, and adjusting its porosity to a range of about 40% to about 90%.

In addition, the valve body can take a traditional general-purpose pumping form, but a valve whose spring pressure is set so as to allow pressure opening depending on writing pressure is suitable as the valve body.

EXAMPLES

Examples are illustrated below. All parts in the examples are indicated by weight.

In the following table are shown a material, a manufacturer and its product code, a friction coefficient of each of prepared friction bodies and results of friction test and rewrite test. The result of the friction test was obtained by a condition of writing paper A (old JIS (Japanese Industrial Standard) P3201: wood free paper made from a stuff of 100% chemical pulp and having a basis weight range of 40 to 157 g/m² and whiteness of 75.0% or above) after thermochromic handwriting formed thereon is rubbed with each friction body. The result of the rewrite test was obtained by a condition of handwriting formed by writing again on the rubbed area.

Additionally, each of the friction coefficient data shown in the table is a value determined when the paper surface is rubbed with each friction body at a speed of 10 mm/min under a load of 500 g by using a surface property tester HEIDON-14D, made by Shinto Scientific Co., Ltd.

TABLE

| | Friction Body | | | |
|---|---|---|---|---|
| | (1) | (2) | (3) | (4) |
| Material | Iron | ABS resin | Polycarbonate | Polypropylene |
| Manufacturer | | Techno Polymer | Sumitomo Dow | Japan Polypropylene |
| Product Code | | Techno 330 | Calire 301-22 | MA1Z |
| Friction Coefficient | 0.121 | 0.181 | 0.193 | 0.209 |
| Friction Test | D | D | D | D |
| Rewrite Test | B | B | B | A |

| | Friction Body | | | |
|---|---|---|---|---|
| | (5) | (6) | (7) | (8) |
| Material | Polyethylene | Nylon based resin | Polypropylene | Nylon based resin |
| Manufacturer | Japan Polyethylene | Arkema | Union Polymer | Arkema |
| Product Code | LJ809A | PEBAX 7033 | 3/8 inch 9.5 mm ball | PEBAX 4033 |
| Friction Coefficient | 0.234 | 0.265 | 0.283 | 0.318 |
| Friction Test | B | B | B | A |
| Rewrite Test | A | A | A | A |

| | Friction Body | | | |
|---|---|---|---|---|
| | (9) | (10) | (11) | (12) |
| Material | Olefin based resin | Polyester based resin | Styrene based resin | Fluorocarbon based resin |
| Manufacturer | Sumitomo Chemical | Mitsubishi Chemical | Aronkasei | Chiyoda Integre |
| Product Code | ESPLOLEX 903 | PRIMALOY B1910N | AR-S 4988C | — |
| Friction Coefficient | 0.325 | 0.339 | 0.463 | 0.502 |
| Friction Test | B | B | A | A |
| Rewrite Test | A | A | A | A |

| | Friction Body | | | |
|---|---|---|---|---|
| | (13) | (14) | (15) | (16) |
| Material | Polyester based resin | Styrene based resin | Chloroprene resin | Styrene based resin |
| Manufacturer | Mitsubishi Chemical | Aronkasei | Chiyoda Integre | Aronkasei |
| Product Code | PRIMALLOY B1900N | AR885 | — | AR875C |
| Friction Coefficient | 0.524 | 0.547 | 0.556 | 0.559 |
| Friction Test | A | A | A | A |
| Rewrite Test | A | A | A | A |

| | Friction Body | | | |
|---|---|---|---|---|
| | (17) | (18) | (19) | (20) |
| Material | Styrene based resin | Nitrile resin | Styrene based resin | Styrene based resin |
| Manufacturer | Aronkasei | Chiyoda Integre | Aronkasei | Aronkasei |
| Product Code | AR160N | — | AR860C | ARBOIC70 |
| Friction Coefficient | 0.646 | 0.649 | 0.697 | 0.746 |
| Friction Test | A | A | A | A |
| Rewrite Test | A | A | A | A |

| | Friction Body | | | |
|---|---|---|---|---|
| | (21) | (22) | (23) | (24) |
| Material | Styrene based resin | Polyester based resin | Silicone resin | EPDM |
| Manufacturer | Aronkasei | Mitsubishi Chemical | Chiyoda Integre | Chiyoda Integre |
| Product Code | AR800C | PRIMALLOY A1602N | — | — |
| Friction Coefficient | 0.780 | 0.880 | 0.898 | 0.908 |
| Friction Test | A | B | B | C |
| Rewrite Test | A | A | A | B |

| | Friction Body | |
|---|---|---|
| | (25) | (26) |
| Material | Styrene based resin | Styrene based resin |
| Manufacturer | Aronkasei | Aronkasei |
| Product Code | AR830C | ARS4020A |
| Friction Coefficient | 1.09 | 1.135 |
| Friction Test | F | F |
| Rewrite Test | F | F |

The symbols used in the above tables for representing the ratings in friction and rewrite tests are explained below.

<Friction Test>

A: None of wrinkling, breakage and unevenness occurs in paper at all.

B: Slight wrinkling and unevenness occur in paper.

C: Wrinkling occurs in paper.

D: Effort is required for changing the color of handwriting, and besides, unevenness occurs in paper.

F: Paper is broken.

<Rewrite Test>

A: Good-quality handwriting is formed.

B: A disturbance of handwriting is observed owing to wrinkling and unevenness having occurred in paper.

F: Writing is impossible because of paper breakage.

Example 1

Preparation of Reversibly Thermochromic Ink

Reversibly thermochromic ink was prepared from:

12.5 parts of microcapsuled pigments which encloses a reversibly thermochromic composition having color-memory properties ($T_1$: −16° C., $T_2$: −8° C., $T_3$: 48° C., $T_4$: 58° C., $\Delta H$: 65° C., average particle size: 2.5 μm, reversibly thermochromic composition/wall film ratio=2.6/1.0, color change from pink to colorless) and containing:
- 2.0 parts of 2-(butylamino)-8-(diphenylamino)-4-methyl-spiro[5H-[1]benzopyrano[2-3-g]pyrimidine-5,1(3'H)-isobenzofuran]-3-one as Component (a);
- 5.0 parts of 2,2-bis(4'-hydroxyphenyl)hexafluoropropane and 3.0 parts of 4,4'-(2-methylpropylidene)bisphenol as Component (b); and
- 50.0 parts of 4-benzyloxyphenylethyl caprate as Component (c),
- 0.33 parts of succinoglycan (a shear thinning property imparting agent),
- 10 parts of urea,
- 10 parts of glycerin,
- 0.6 parts of a nonionic permeability imparting agent,
- 0.1 parts of an antifoaming agent of modified silicone type,
- 0.1 parts of a fungicide and
- 66.37 parts of water.

<Making of Writing Instrument (See FIG. 1)>

The thus prepared ink 4 (the microcapsuled pigments of which were cooled in advance to −16° C. or below to result in a pink coloration, and left at room temperature) was charged by suction into a polypropylene pipe (ink accommodation tube 21) having an inside diameter of 4.4 mm, and connected to a ballpoint tip 3 via a resin holder 22.

Then, an ink follower 5 (liquid stopper) containing polybutene as a main constituent and having viscoelasticity as a main component was charged into the polypropylene pipe from the rear of the pipe, and a tail plug 23 was fitted in the rear of the pipe, there by preparing a refill 2. Furthermore, the refill 2 was mounted inside a barrel 6 (composed of a front barrel and a rear barrel), a cap 7 was fitted, and then deaeration was performed by centrifugal operation. Thus, a writing instrument 1 (ballpoint pen) was obtained.

The ballpoint pen tip held a hard metal ball of which diameter is 0.7 mm in a ball holding part formed by cutting a metallic material with a drill, and the ball was urged forwardly by a spring.

Moreover, a friction body 8 made from the same resin as the friction body (14) in the table was mounted to the end of the rear barrel.

By writing with the thus obtained writing instrument, characters of a pink color (handwriting) were formed on a paper surface.

The handwriting was of a pink color at room temperature (25° C.), and the characters were decolorized and rendered colorless when rubbed with the friction body. This colorless state was kept under room temperature, and the original pink color recovered under cooling to −16° C. or below. This color changing behavior was recurred.

Neither large wrinkles nor breakage was observed on the paper surface where handwriting was formed and erased, so the friction body was able to satisfy repetitive practicality.

Example 2

Preparation of Reversibly Thermochromic Ink

Reversibly thermochromic ink was prepared from:

25.7 parts of microcapsuled pigments which contains a reversibly thermochromic composition having color-memory properties ($T_1$: −20° C., $T_2$: −9° C., $T_3$: 40° C., $T_4$: 57° C., $\Delta H$: 63° C., average particle size: 2.5 μm, reversibly thermochromic composition/wall film ratio=2.6/1.0, color change from black to colorless) and containing:
- 4.5 parts of 2-(2-chloroanilino)-6-di-n-butylaminofluoran as Component (a);
- 4.5 parts of 4,4'-(2-methylpropylidene)bisphenol and 7.5 parts of 2,2-bis(4'-hydroxyphenyl) hexafluoropropane as Component (b); and
- 50.0 parts of 4-benzyloxyphenylethyl caprate as Component (c),
- 0.2 parts of succinoglycan (shear thinning property imparting agent),
- 5.5 parts of urea,
- 7.5 parts of glycerin,
- 0.03 parts of a nonionic permeability imparting agent,
- 0.15 parts of an antifoaming agent of modified silicone type,
- 0.1 parts of a fungicide,
- 0.5 parts of a lubricant,
- 0.5 parts of triethanolamine and
- 59.82 parts of water.

<Making of Writing Instrument (See FIG. 2)>

The thus prepared ink 4 (the microcapsuled pigments of which were cooled in advance to −20° C. or below to result in a black coloration, and left at room temperature) was charged into a polypropylene barrel 6 having an inside diameter of 7.0 mm and an outside diameter of 10 mm, the front-end of which a ball point tip 3 was fixed to. Then an ink follower 5 containing polybutene as a main component and having viscoelasticity was charged into the barrel from the rear end. Further, a friction body 8 made from the same resin as the friction body (17) in the table was fitted in the rear of the barrel.

Furthermore, a cap 7 was fitted, and then deaeration was performed by centrifugal operation. Thus, a writing instrument 2 (ballpoint pen) was obtained.

The ballpoint pen tip held a hard metal ball of which diameter is 0.7-mm in a ball holding part formed by cutting a metallic material with a drill, and the ball was urged forwardly by a spring.

By writing with the thus obtained writing instrument, characters of a black color (handwriting) were formed on a paper surface.

The handwriting was of a black color at room temperature (25° C.), and the characters were decolorized and rendered colorless when rubbed with the friction body. This colorless state was kept under room temperature, and the original black color recovered under cooling to −20° C. or below. This color changing behavior was recurred.

Neither large wrinkles nor breakage was observed on the paper surface where handwriting was formed and erased, so the friction body was able to satisfy repetitive practicality.

Example 3

Preparation of Reversibly Thermochromic Ink

Reversibly thermochromic ink was prepared from:

25.7 parts of microcapsuled pigments which contains a reversibly thermochromic composition having color-memory properties ($T_1$: −14° C., $T_2$: −6° C., $T_3$: 48° C., $T_4$: 60° C., $\Delta H$: 64° C., average particle size: 2.5 μm, reversibly thermochromic composition/wall film ratio=2.6/1.0, color change from blue to colorless) and containing:

2.0 parts of 3-(4-diethylamino-2-hexyloxyphenyl)-3-(1-ethyl-2-methylind ole-3-yl)-4-azaphthalide as Component (a);

3.0 parts of 4,4'-(2-methylpropylidene)bisphenol and 5.0 parts of 2,2-bis(4'-hydroxyphenyl)hexafluoropropane as Component (b); and 50.0 parts of 4-benzyloxyphenylethyl caprate as Component (c), 0.2 parts of succinoglycan (a shear thinning property imparting agent), 5.5 parts of urea, 7.5 parts of glycerin, 0.03 parts of a nonionic permeability imparting agent, 0.15 parts of an antifoaming agent of modified silicone type, 0.1 parts of a fungicide, 0.5 parts of a lubricant, 0.5 parts of triethanolamine and 59.82 parts of water.

<Making of Writing Instrument (See FIG. 3)>

The thus prepared ink 4 (the microcapsuled pigments of which were cooled in advance to −14° C. or below to result in a blue coloration, and left at room temperature) was charged by suction into a polypropylene pipe (ink accommodation tube 21) having an inside diameter of 4.4 mm, and connected to a ballpoint tip 3 via a resin holder 22.

Then, an ink follower 5 (liquid stopper) containing polybutene as a main component and having viscoelasticity was charged into the polypropylene pipe from the rear of the pipe, and a tail plug 23 was fitted in the rear of the pipe, thereby preparing a refill 2. Furthermore, the refill 2 was mounted inside a barrel 6 (composed of a front barrel and a rear barrel), a cap 7 was fitted, and then deaeration was performed by centrifugal operation. Thus, a writing instrument 1 (ballpoint pen) was obtained.

The ballpoint pen tip held a hard metal ball of which diameter is 0.7 mm in a ball holding part formed by cutting a metallic material with a drill, and the ball was urged forwardly by a spring.

Moreover, a friction body 8 made from the same resin as the friction body (7) in the foregoing table was mounted in the top end of the cap.

By writing with the thus obtained writing instrument, characters of a blue color (handwriting) were formed on a paper surface.

The handwriting was of a blue color at room temperature (25° C.), and the characters were decolorized and rendered colorless when rubbed with the friction body. This colorless state was kept under room temperature, and the original blue color recovered under cooling to −14° C. or below. This color changing behavior was recurred.

And neither large wrinkles nor breakage was observed on the paper surface where handwriting was formed and erased, so the friction body was able to satisfy repetitive practicality.

Example 4

Preparation of Microcapsule Particles

A composition containing 3.0 parts of 2,2-bis(4'-hydroxyphenyl)hexafluoropropane; 3.0 parts of 1,1-bis(4-hydroxyphenyl)decane; and 50.0 parts of stearyl caprate was dissolved homogeneously by heating, and mixed with 25.0 parts of an aromatic polyisocyanate prepolymer as a wall film material and 50.0 parts of an assistant solvent. The resultant solution was dispersed and emulsified so as to form fine droplets in 8% water solution of polyvinyl alcohol, and agitation of the resulting emulsion was continued for about 1 hour at 70° C. Then, it was mixed with 2.5 parts of a water-soluble modified aliphatic amine, and the agitation thereof was continued for additional 6 hours. Thus, a suspension of microcapsule particles was obtained.

The suspension was centrifuged to isolate the microcapsule particles.

As to the microcapsule particles obtained, their specific gravity was found to be 0.97 and their average particle size was found to be 2.5 µm.

<Preparation of Reversibly Thermochromic Ink Composition>

A reversibly thermochromic aqueous ink composition was prepared by adding 13.0 parts of microcapsuled pigments which contains a reversibly thermochromic composition having color-memory properties ($T_1$: −20° C., $T_2$: −10° C., $T_3$: 46° C., $T_4$: 60° C., $\Delta H$: 68° C., average particle size: 2.5 µm, reversibly thermochromic composition/wall film ratio=2.6/1.0, color change from orange to colorless) and containing:

2.5 parts of 1,3-dimethyl-6-diethylaminofluoran as Component (a);

3.0 parts of 4,4'-(2-methylpropylidene)bisphenol and 5.0 parts of 2,2-bis(4'-hydroxyphenyl)hexafluoropropane as Component (b); and 50.0 parts of 4-benzyloxyphenylethyl caprate as Component (c), 7.0 parts of the microcapsule particles, 0.5 parts of hydroxyethyl cellulose (CELLOSIZE WP-09B, trade name, a product of Union Carbide Japan), 15.0 parts of glycerin, 0.02 parts of an antifoaming agent, 1.5 parts of a fungicide, 0.2 parts of a surface tension controlling agent, 62.78 parts of water and 0.1 parts of a 10% dilute phosphoric acid solution, together, and are homogenizingly mixed by stirring. Further, the pH of the ink was adjusted to about 5.5 to thereby obtain a reversibly thermochromic aqueous ink composition.

The specific gravity of the ink vehicle (ink constituents exclusive of the reversibly thermochromic microcapsuled pigments and the microcapsule particles) was found to be 1.03.

<Making of Writing Instrument (See FIG. 4)>

A writing instrument 1 (marking pen) was obtained by incorporating the ink 4 (the microcapsuled pigments of which was cooled in advance to −20° C. or below to result in an orange coloration, and left at room temperature) and a stirrer 9 (metallic ball having a diameter of 3 mm) into a barrel 6 (made up of a front barrel and a rear barrel), and mounting a marking pen chip 3 [a chisel-shaped fibrous pen body (porosity: about 53%)] in the front-end part of the barrel through a valve mechanism 10.

The valve mechanism 10 was structurally designed to open the valve by writing pressure applied to the pen body.

The thus obtained writing instrument of direct-ink type was provided with a detachable cap 7, and besides, a friction body 8 made from the same resin material as the friction body (16) in the table was mounted to the rear-end part of the barrel.

By use of the thus obtained writing instrument, orange lines (handwriting) were drawn on images (characters) printed on a paper surface.

The lines were of an orange color at room temperature (25° C.), and they were decolorized and rendered colorless when rubbed with the friction body. This colorless state was kept under room temperature, and the original orange color recovered under cooling to −20° C. or below. This color changing behavior was recurred.

Neither large wrinkles nor breakage was observed on the paper surface where handwriting was formed and erased, so the friction body was able to satisfy repetitive practicality.

<Preparation of Reversibly Thermochromic Ink>

An aqueous medium containing:

20 parts of microcapsuled pigments which contains a reversibly thermochromic composition having color-memory properties ($T_1$: −16° C., $T_2$: −8° C., $T_3$: 48° C., $T_4$: 58° C., $\Delta H$: 65° C., average particle size: 2.5 µm, reversibly thermochromic composition/wall film ratio=2.6/1.0, color change from pink to colorless) and containing:
- 2.0 parts of 2-(butylamino)-8-(diphenylamino)-4-methylspiro[5H-[1]benzo pyrano[2-3-g]pyrimidine-5,1(3'H)-isobenzofuran]-3-one as Component (a);
- 5.0 parts of 2,2-bis(4'-hydroxyphenyl)hexafluoropropane and 3.0 parts of 4,4'-(2-methylpropylidene)bisphenol as Component (b); and
- 50.0 parts of 4-benzyloxyphenylethyl caprate as Component (c);
- 5 parts of glycerin,
- 0.7 parts of a fungicide,
- 0.1 parts of an antifoaming agent of silicone type and
- 73.7 parts of water, was made homogeneously dispersed. After that, 0.5 parts of hydroxyethyl cellulose (CELLOSIZE WP-09L, trade name, a product of Union Carbide Japan) was mixed therein. Thus, a reversibly thermochromic ink in which the reversibly thermochromic pigment particles were suspended in a loosely aggregated state was prepared.

A fiber-bundled ink absorber 11 made by covering polyester slivers with a synthetic resin film (porosity: about 80%) was impregnated with the reversibly thermochromic ink (the microcapsuled pigments of which was cooled in advance to −16° C. or below to result in a pink coloration, and left at room temperature) immediately after the ink was stirred and made homogeneous, and charged to a barrel 6. The ink absorber 11 and a bombshell-shaped resin-treated pen body 3 (porosity: about 50%) made of polyester fibers and mounted in the front-end part of the barrel were assembled in a contact state, and a cap 7 was fitted. Thus, a writing instrument 1 (marking pen) was obtained.

A friction body 8 made from the same resin material as the friction body (19) in the table was provided on the rear-end part of the barrel by two-color molding.

By writing with the thus made writing instrument, characters of a pink color (handwriting) were formed on a paper surface.

By writing with the thus made writing instrument, characters of a pink color (handwriting) were formed on a paper surface.

The handwriting was of a pink color at room temperature (25° C.), and the characters were decolorized and rendered colorless when rubbed with the friction body. This colorless state was kept under room temperature, and the original pink color recovered under cooling to −16° C. or below. This color changing behavior was recurred.

Neither large wrinkles nor breakage was observed on the paper surface where handwriting was formed and erased, so the friction body was able to satisfy repetitive practicality.

Example 6

Preparation of Reversibly Thermochromic Ink

Reversibly thermochromic ink was prepared from 20.0 parts of microcapsuled pigments which contains a reversibly thermochromic composition having color-memory properties ($T_1$: −20° C., $T_2$: −9° C., $T_3$: 40° C., $T_4$: 57° C., $\Delta H$: 63° C., average particle size: 2.5 µm, reversibly thermochromic composition/wall film ratio=2.6/1.0, color change from black to colorless) and containing:
- 4.5 parts of 2-(2-chloroanilino)-6-di-n-butylaminofluoran as Component (a),
- 4.5 parts of 4,4'-(2-methylpropylidene) bisphenol and 7.5 parts of 2,2-bis(4'-hydroxyphenyl) hexafluoropropane as Component (b) and
- 50.0 parts of 4-benzyloxyphenylethyl caprate as Component (c),
- 5.0 parts of urea,
- 15.0 parts of glycerin,
- 5.0 parts of carbolic acid,
- 0.5 parts of a lubricant [PRISURFAL, produced by Daiichi Kogyo Seiyaku Co., Ltd.],
- 0.5 parts of triethanolamine and
- 54.0 parts of water.

<Making of Writing Instrument (See FIG. 6)>

A ballpoint pen 1 was obtained by containing the thus prepared ink 4 (microcapsuled pigments of which was cooled in advance to −20° C. or below, and left at room temperature) directly in a barrel 6. The ballpoint pen 1 was provided with an ink flow control member 12 with a comb-like grooves in the forward part of the barrel, and a ballpoint pen chip 3 structured to hold a hard metal ball of which diameter is 0.5 mm in the front-end of a chip formed by deforming the neighborhood of a metal pipe end in an inward direction under pressure applied to the outer surface of the metal pipe end.

Figure 6:
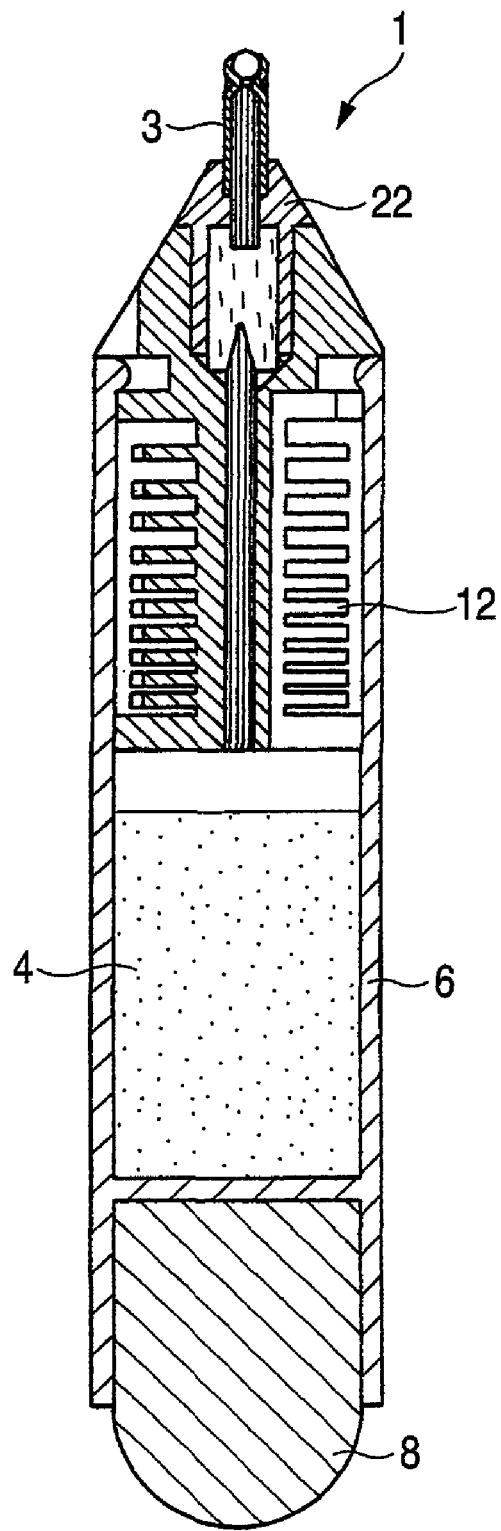
FIG. 6 is a longitudinal cross-sectional view showing still another embodiment of a writing instrument provided with a friction body according to the invention.

The thus obtained writing instrument was provided with a detachable cap 7 (not shown in FIG. 6). Further, a friction body 8 made from the same resin material as the friction body (16) in the table was mounted to the rear-end part of the barrel.

By writing with the thus made writing instrument, characters of a black color (handwriting) were formed on a paper surface.

The handwriting was of a black color at room temperature (25° C.), and the characters were decolorized and rendered colorless when rubbed with the friction body. This colorless state was kept under room temperature, and the original black color recovered under cooling to −20° C. or below. This color changing behavior was recurred.

Neither large wrinkles nor breakage was observed on the paper surface where handwriting was formed and erased, so the friction body was able to satisfy repetitive practicality.

Example 7

Figure 7:
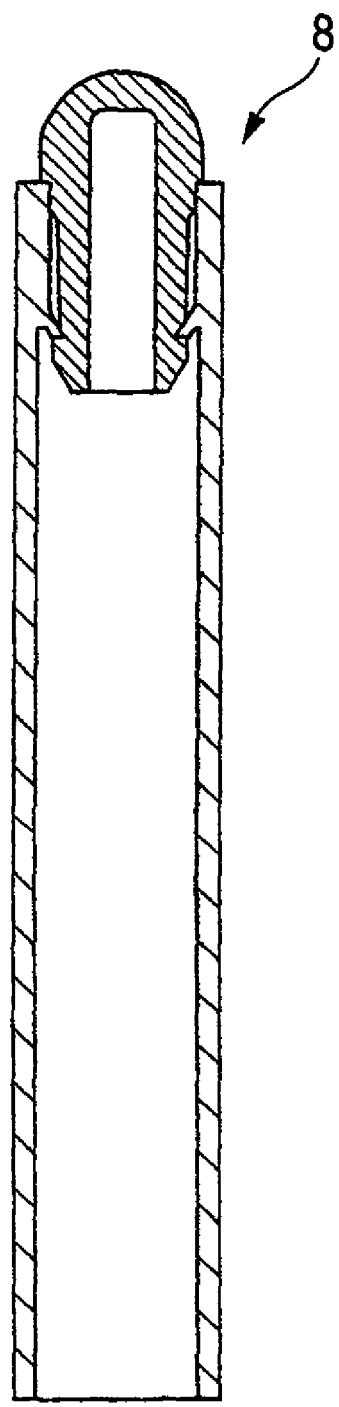
FIG. 7 is a longitudinal cross-sectional view showing a friction body according to the invention.
Figure 8:
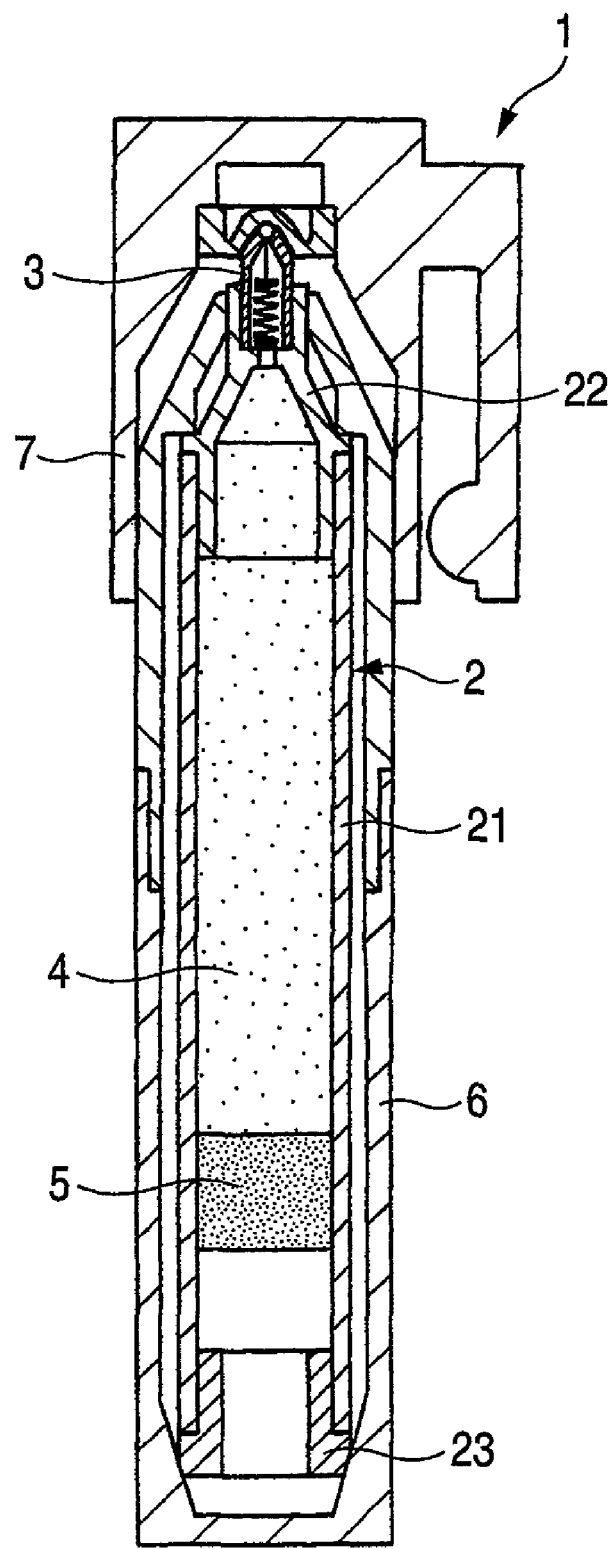
FIG. 8 is a longitudinal cross-sectional view showing a writing instrument used in combination with the friction body shown in FIG. 6.

Making of Friction Body (See FIG. 7)

A friction member 8 was obtained by fitting the friction body molded of the same resin material as the friction body (20) in the table into a plastic tubular body.

<Making of Writing Instrument (See FIG. 8)>

The ink 4 prepared in the same manner as in Example 1 (the microcapsuled pigments of which were cooled in advance to −16° C. or below to result in a pink coloration, and left at room temperature) was charged by suction into a polypropylene pipe (ink accommodation tube 21) having an inside diameter of 4.4 mm, and connected to a ballpoint tip 3 via a resin holder 22.

Then, an ink follower 5 (liquid stopper) containing polybutene as a main component and having viscoelasticity was charged into the polypropylene pipe from the rear of the pipe, and a tail plug 23 was fitted in the rear of the pipe, thereby preparing a refill 2. Furthermore, the refill 2 was mounted inside a barrel 6 (composed of a front barrel and a rear barrel), a cap 7 was fitted, and then deaeration was performed by centrifugal operation. Thus, a writing instrument 1 (ballpoint pen) was obtained.

The ballpoint pen tip held a hard metal ball of which diameter is 0.7 mm in a ball holding part formed by cutting a metallic material with a drill, and the ball was urged forwardly by a spring.

<Making of Writing Instrument Set>

The friction body and the writing instrument were combined into a writing instrument set.

By writing with the writing instrument, characters of a pink color (handwriting) were formed on a paper surface.

The handwriting was of a pink color at room temperature (25° C.), and the characters were decolorized and rendered colorless when rubbed with the friction body. This colorless state was kept under room temperature, and the original pink color recovered under cooling to −16° C. or below. This color changing behavior was recurred.

Neither large wrinkles nor breakage was observed on the paper surface where handwriting was formed and erased, so the friction body was able to satisfy repetitive practicality.

Example 8

Making of Friction Body

The same resin material as used for the friction body 11 in the table was molded into a rectangular friction body.

<Making of Writing Instruments>

The same ink compositions as prepared respectively in Examples 1 to 3 (the microencapsulated pigments of which were cooled in advance so as to develop their individual colors, and left at room temperature) were charged by suction into separate polypropylene pipes having the same inside diameter of 4.4 mm (ink accommodation tubes), and connected to their respective ballpoint tips via their respective resin holders.

Then, each of the polypropylene pipes was charged from the rear with an ink follower (liquid stopper) containing polybutene as a main constituent and having viscoelasticity, and further fitted with a tail plug in the rear portion of the pipe, thereby making each individual refill. Furthermore, the refills were mounted inside of respective barrels (each of which was composed of a front barrel and a rear barrel), respective caps were fitted, and then deaeration was performed by centrifugal operation. Thus, three writing instruments (ballpoint pens) were obtained.

Each of the ballpoint pen tips held hard metal ball of which diameter is 0.5 mm in a ball holding part formed by cutting a metallic material with a drill, and the balls were urged forwardly by respective springs.

<Making of Writing Instrument Set>

The friction body and the writing instruments were combined into a writing instrument set.

By writing with the writing instruments, characters of a pink color, a block color and a blue color (handwriting) were formed on a paper surface.

The handwritings were of three colors at room temperature (25° C.), and the characters were decolorized and rendered colorless when rubbed with the friction body. These colorless states were kept under room temperature, and the original colors recovered under cooling to −20° C. or below. These color changing behaviors were recurred.

Neither large wrinkles nor breakage was observed on the paper surface where handwritings were formed and erased, so the friction body was able to satisfy repetitive practicality.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A writing instrument for producing thermochromic handwriting comprising:
   a friction body that produces frictional heat allowing development, disappearance or change of color of handwriting formed with the writing instrument,
   wherein the writing instrument is configured to use a coloring agent being a microencapsulated pigment prepared by enclosing in microcapsules a reversibly thermochromic composition which contains at least three essential ingredients: (a) an electron-donating color-showing organic compound; (b) an electron-accepting compound; and (c) a reaction medium determining the temperature at which color reaction between (a) and (b) takes place, and whose color disappears by heating, the coloring agent having a completely decolorizing temperature within a range of from 50° C. to 80° C.,
   wherein the friction body has a friction coefficient of 0.4 to 0.8 when rubbed against a paper surface.

2. The writing instrument according to claim 1, wherein the friction body is provided at a rear end of a barrel.

3. The writing instrument according to claim 1, further comprising a cap,
   wherein the friction body is provided at a tip end of the cap.

4. The writing instrument according to claim 1, wherein the writing instrument accommodates a thermochromic ink therein.

5. A writing instrument set, comprising
   a friction member comprising the friction body of claim 1; and
      the writing instrument for producing thermochromic handwriting of claim 1.

6. A writing instrument set, comprising
   pluralities of the writing instruments of claim 1 for producing handwritings with different color tones.

7. The writing instrument set according to claim 5, wherein the writing instrument accommodates a thermochromic ink therein.

* * * * *